May 5, 1959

D. G. LYON 2,885,097

AUTOMATIC PALLET LOADER

Filed Dec. 17, 1954

Donald G. Lyon
INVENTOR.

BY *Clarence A. O'Brien*
*and Harvey B. Jackson*
Attorneys

May 5, 1959     D. G. LYON     2,885,097
AUTOMATIC PALLET LOADER

Filed Dec. 17, 1954     13 Sheets-Sheet 2

Donald G. Lyon
INVENTOR.

BY *Clarence A. O'Brien*
*and Harvey B. Jacobson*
Attorneys

May 5, 1959 D. G. LYON 2,885,097
AUTOMATIC PALLET LOADER
Filed Dec. 17, 1954 13 Sheets-Sheet 3

Donald G. Lyon
INVENTOR.

BY
Attorneys

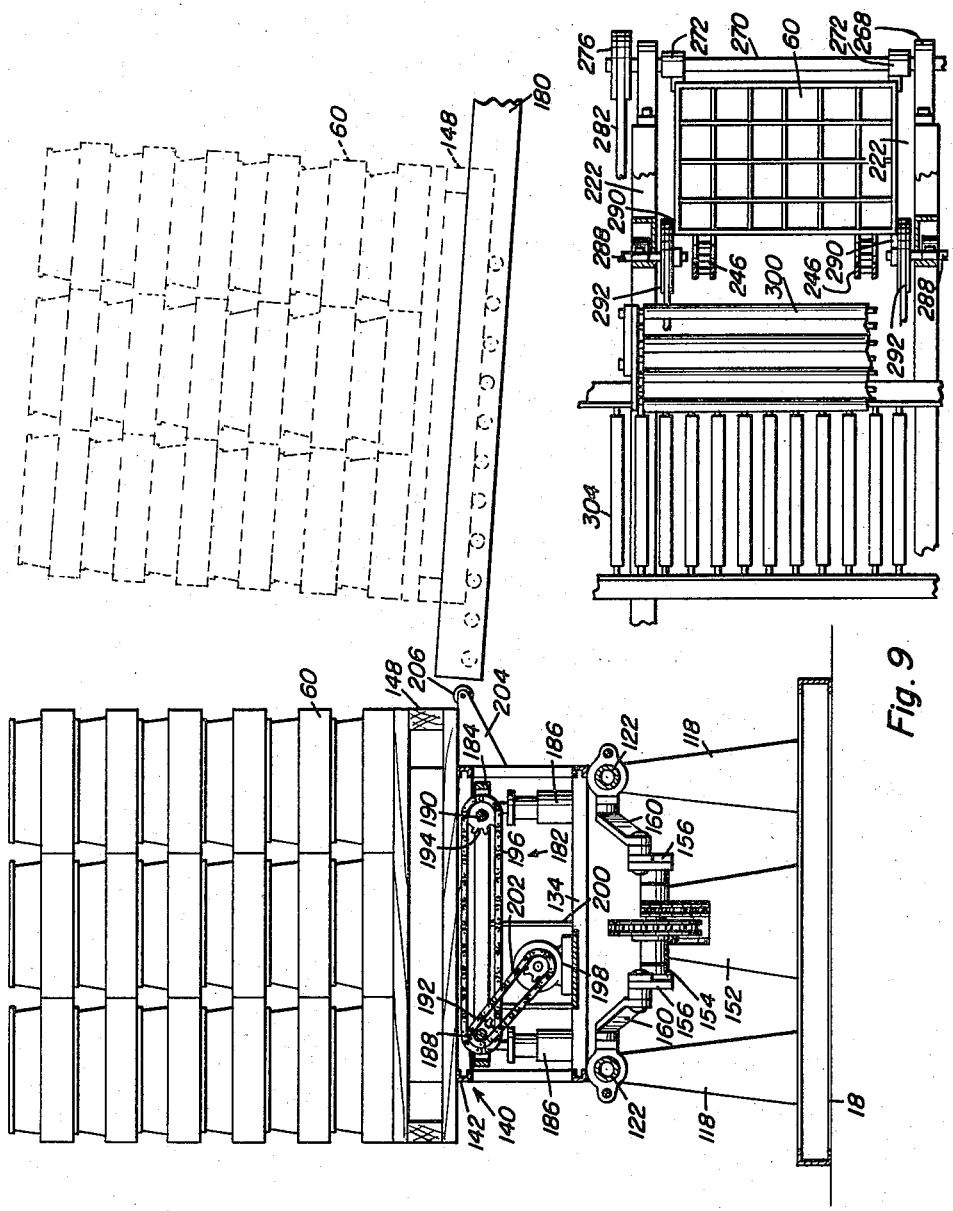

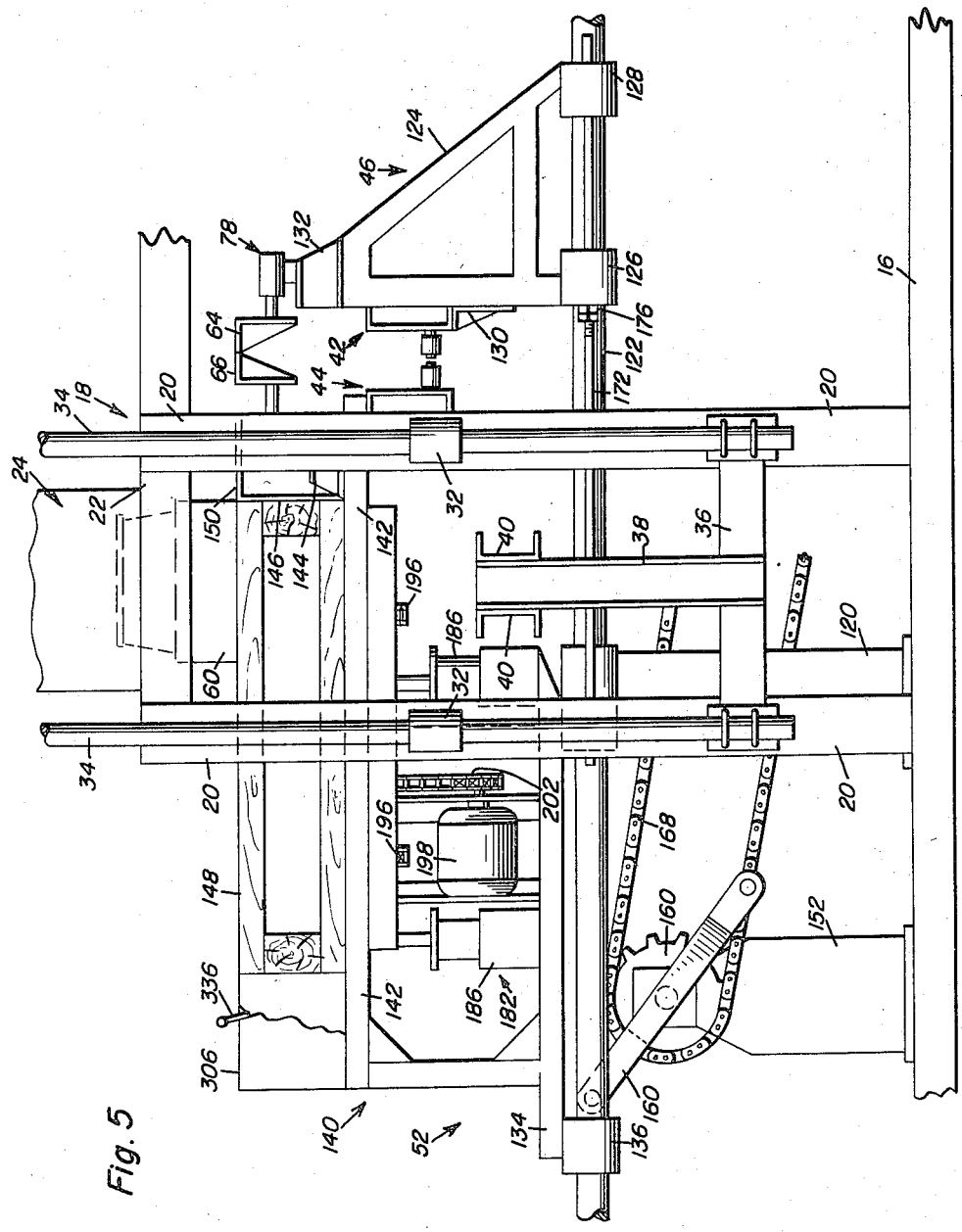

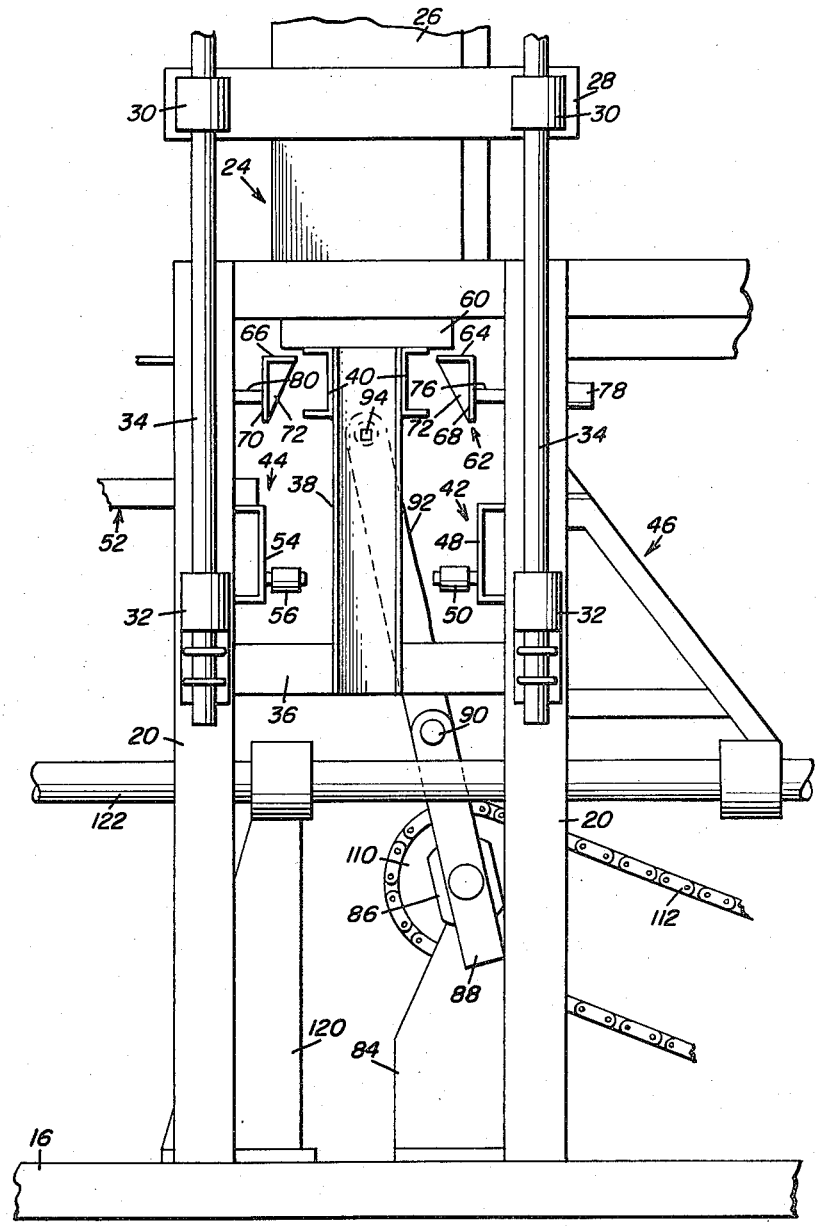

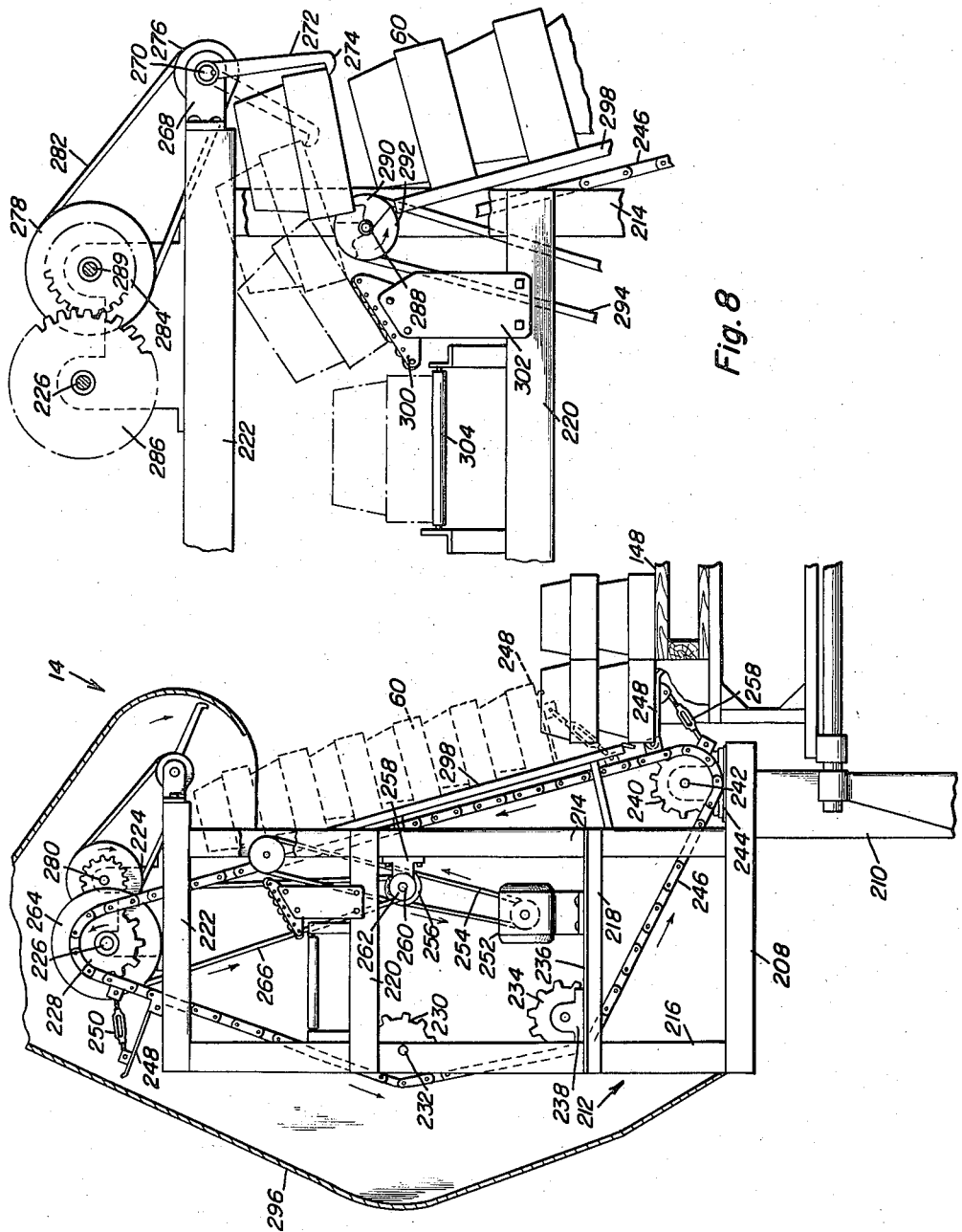

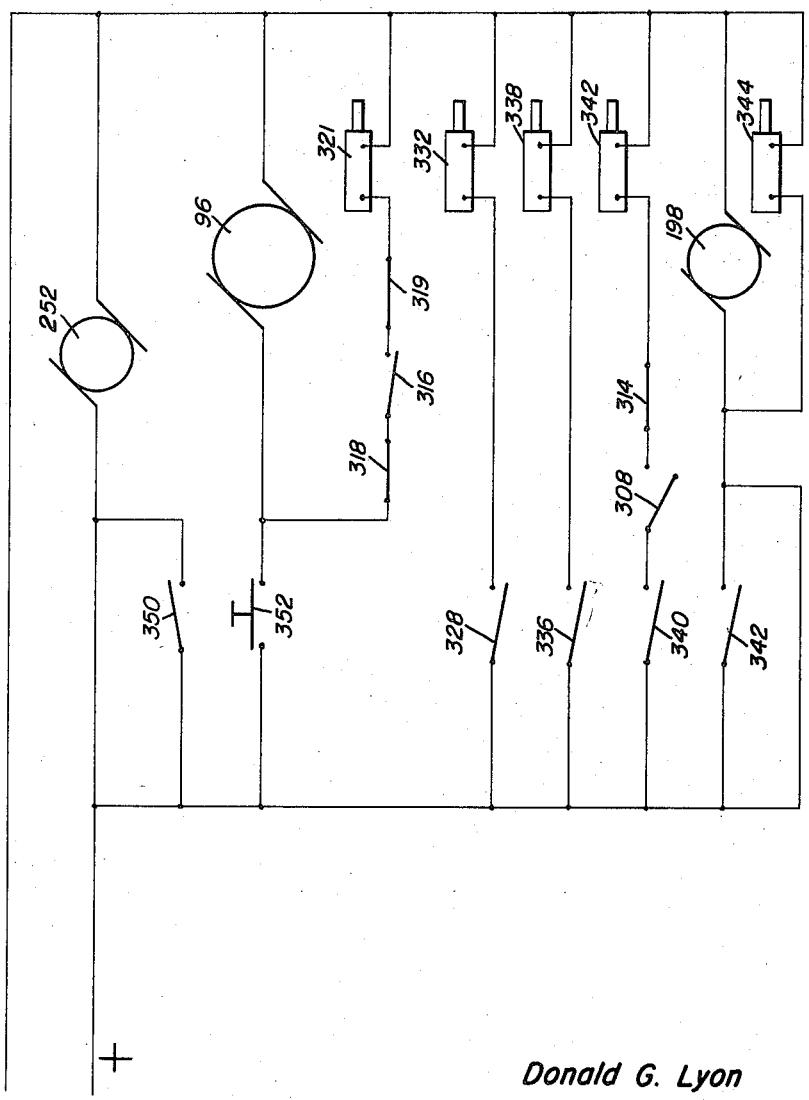

Donald G. Lyon
INVENTOR.

May 5, 1959     D. G. LYON     2,885,097
AUTOMATIC PALLET LOADER
Filed Dec. 17, 1954     13 Sheets-Sheet 10

Donald G. Lyon
INVENTOR.

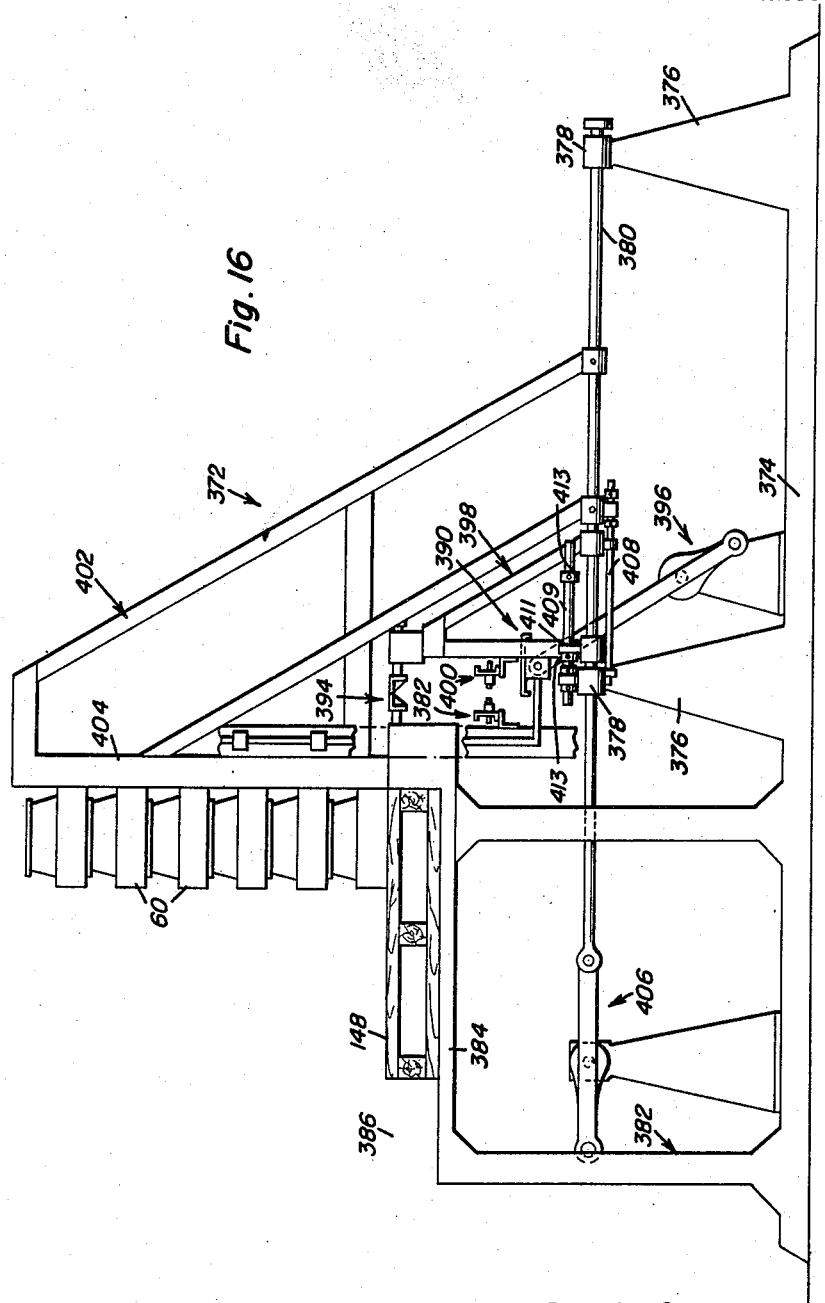

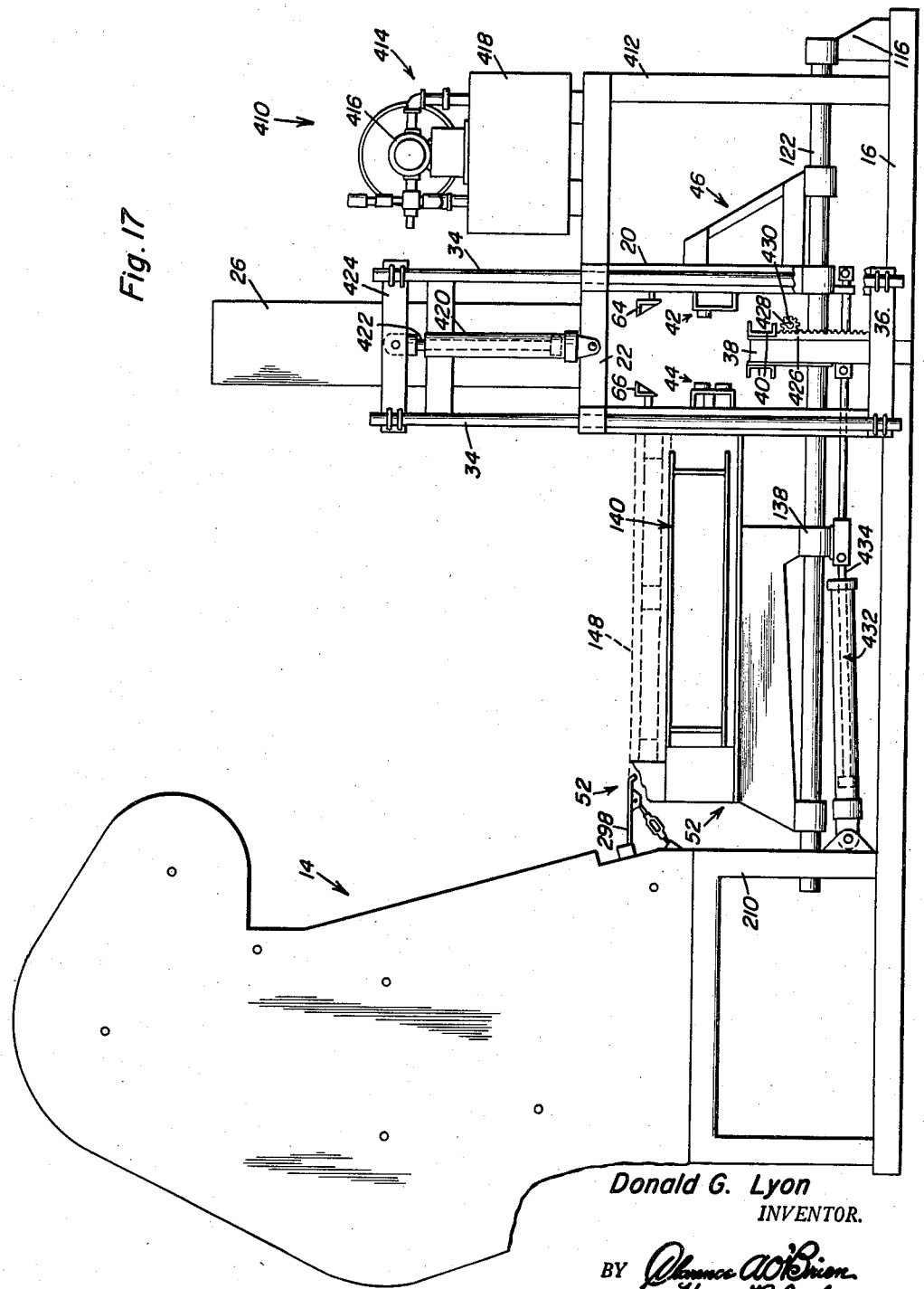

May 5, 1959
D. G. LYON
2,885,097
AUTOMATIC PALLET LOADER
Filed Dec. 17, 1954
13 Sheets-Sheet 13
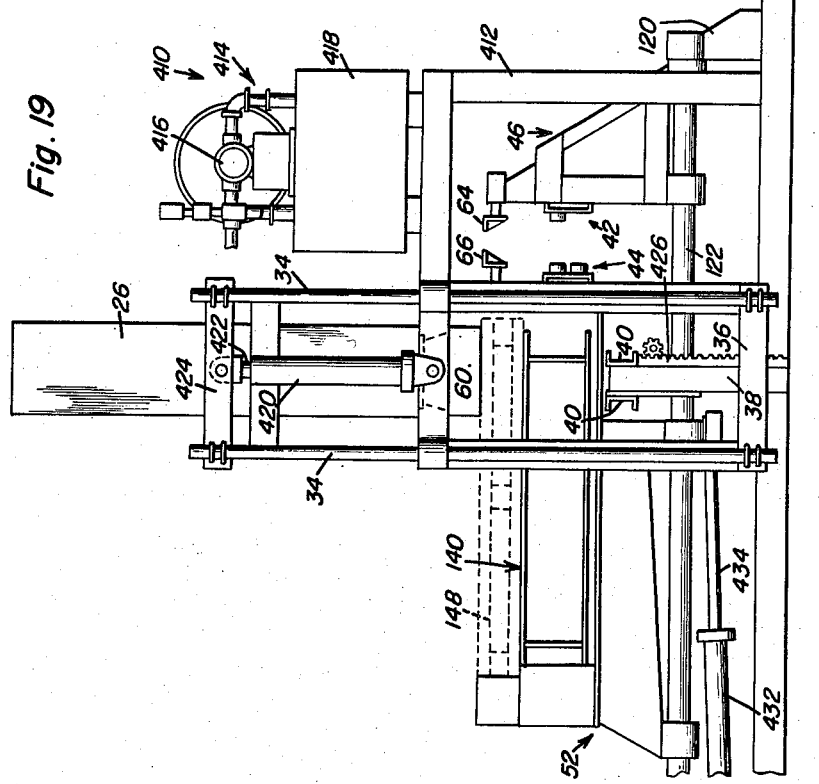
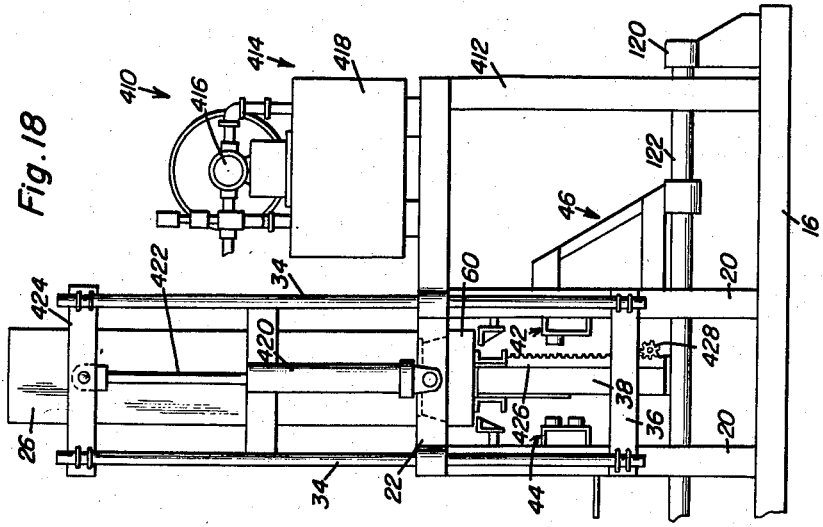
Donald G. Lyon INVENTOR.
BY

United States Patent Office 2,885,097
Patented May 5, 1959

2,885,097

AUTOMATIC PALLET LOADER

Donald G. Lyon, Monticello, Iowa, assignor to Barry-Wehmiller Machinery Company, St. Louis, Mo., a corporation of Missouri Application December 17, 1954, Serial No. 475,968

16 Claims. (Cl. 214—6)

This invention relates in general to new and useful improvements in material handling devices, and more particularly to an improved automatic pallet loader.

In many industries, there have been provided elaborate assembly lines for producing small articles of all types. However, such assembly lines normally end in a staging area where it is necessary for workmen to handle individual packages of such articles. The individual packages in many instances are hand loaded onto pallets for convenient loading and unloading into boxcars or onto road vehicles of different types. It is readily apparent that much time and labor could be saved if there were provided a suitable pallet loader which would take the article from the end of the assembly line and automatically load it onto a pallet for further shipment.

Therefore, it is the primary object of this invention to provide an automatic pallet loader which is of such a nature whereby it may be positioned at an end of an assembly line for receiving individual articles or small packages of articles and first stacking such articles into stacks of desired height and then shifting said stacks with respect to a pallet so that the stacks may be positioned on the pallet automatically.

Another object of this invention is to provide an automatic pallet loader which is of the type whereby relatively small articles may be first arranged in stacks and then such stacks positioned on a pallet, the pallet loader being capable of placing more than one stack or rows of stacks onto a single pallet.

Another object of this invention is to provide an improved pallet loader which is automatic in operation and which is so constructed whereby it may receive in continuous sequence individual articles or small packages of articles from a conveyor line and move such articles into stacked relation on a pallet.

A further object of this invention is to provide an improved automatic pallet loader which is of such a construction whereby individual articles or packages of articles may be received at a level which is substantially the same level of an assembly line or conveyor and which will stack such articles onto a pallet which remains substantially at the same level as that of the initial position of the article when received by the automatic pallet loader.

A still further object of this invention is to provide an automatic pallet loader which is so constructed whereby when a pallet is fully loaded, the pallet is shifted off the pallet loader and onto a conveyor for movement to a staging area or a suitable storage area.

In the bottling industry, it has been a customary procedure in recent years to place empty bottles into one end of an assembly line or conveyor system and such bottles are first washed and sterilized, filled with a soft drink, capped and eventually automatically placed into cartons or cases where they are then delivered to a storage or loading area. The bottling industry has advanced to the stage where the cases are hand loaded onto pallets and such pallets are loaded onto trucks for delivery. While there have been devised prior to this time automatic pallet loaders, such pallet loaders are both very expensive and require a special set-up for connection to a conveyor system.

It is therefore another object of this invention to provide an automatic pallet loader which is so constructed whereby it will receive cases of soft drinks from a conveyor and which will stack such cases into stacks and then transfer the stacks onto pallets whereby the pallets may be automatically loaded for loading onto trucks or the like.

In the bottling industry, once a truck employing the pallet system has delivered the cases of filled bottles and returns with pallets loaded with cases of empty bottles, it is necessary that the pallets be first removed from a truck and then placed in a position adjacent an end of a conveyor system where the bottles from the empty cases are placed into the conveyor of the automatic bottle washer and filling mechanism. In doing this, it is necessary for laborers to first remove the individual cases from the pallet and then remove the bottles from the individual cases.

It is therefore still another object of this invention to provide an automatic scrambler or unstacker for palletized cases of bottles and the like.

Still another object of this invention is to provide an automatic scrambler for palletized cases of bottles, the scrambler being of such a nature whereby it receives stacks of cases from a pallet and individually places such cases onto a conveyor for movement towards a receiving end of a bottle washing machine.

A still further object of this invention is to provide an improved automatic pallet loader including a scrambler, the pallet loader being intended to automatically arrange articles in stacks and then place such stacks onto a pallet, the pallet originally being provided with first stacks of such articles whereby the first stacks are removed from the pallet as the other stacks are placed thereon, the stacks of first articles being moved into operative engagement with the scrambler whereby the individual articles are removed from the stacks and placed upon conveyors leading away from the automatic pallet loader.

Still another object of this invention is to provide an automatic pallet loader which with slight changes in various equipment thereof and timing may be adapted not only to articles of various heights, but also to articles which are box-like and which are normally difficult to handle with an automatic pallet loader.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a side elevational view of the automatic bottle loader and scrambler which are the subjects of this invention, and shows the automatic pallet loader in the operation of loading second cases of bottles in stacks onto a pallet and at the same time removing stacks of first cases of bottles from such pallet into operative engagement with the scrambler, one case being shown in a position for elevation into a stacking position, an article delivering conveyor for the automatic pallet loader being omitted for purposes of clarity;

Figure 1:
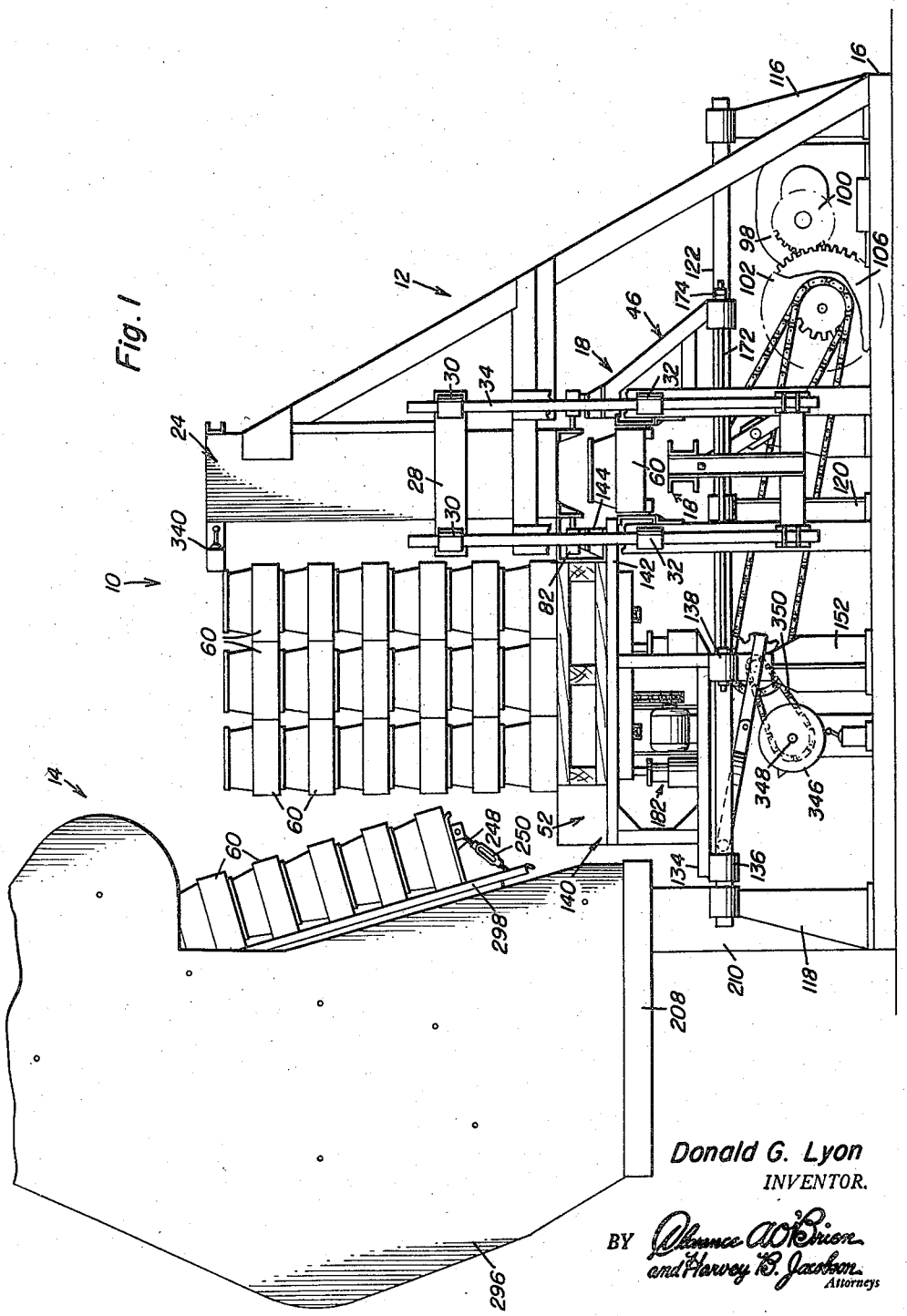
Figure 11:
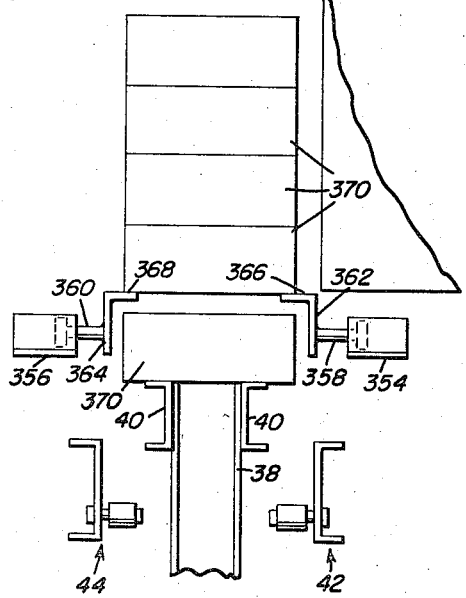
Figure 12:
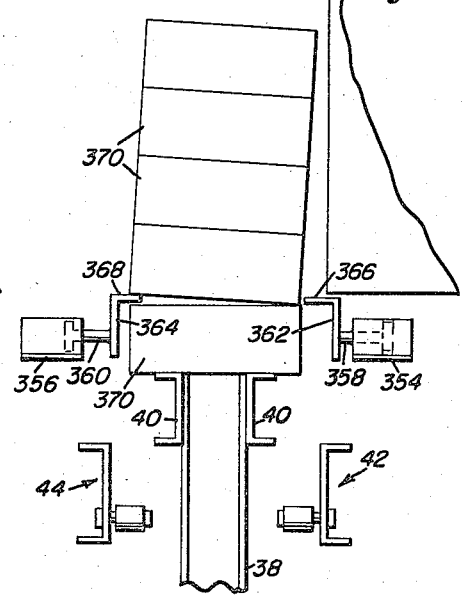
Figure 13:
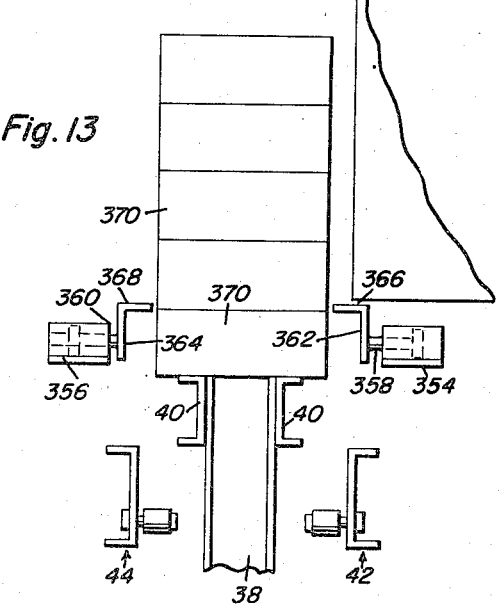
Figure 14:
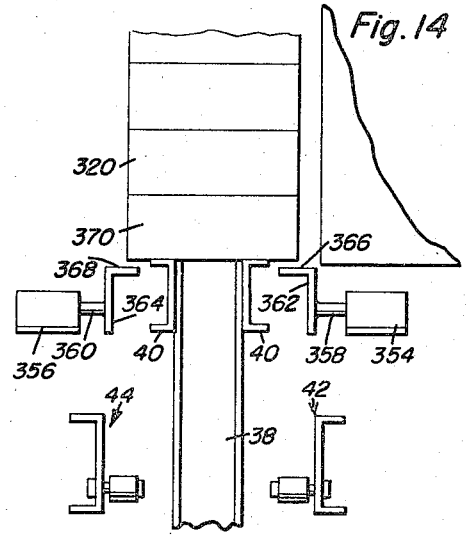
Figure 15:
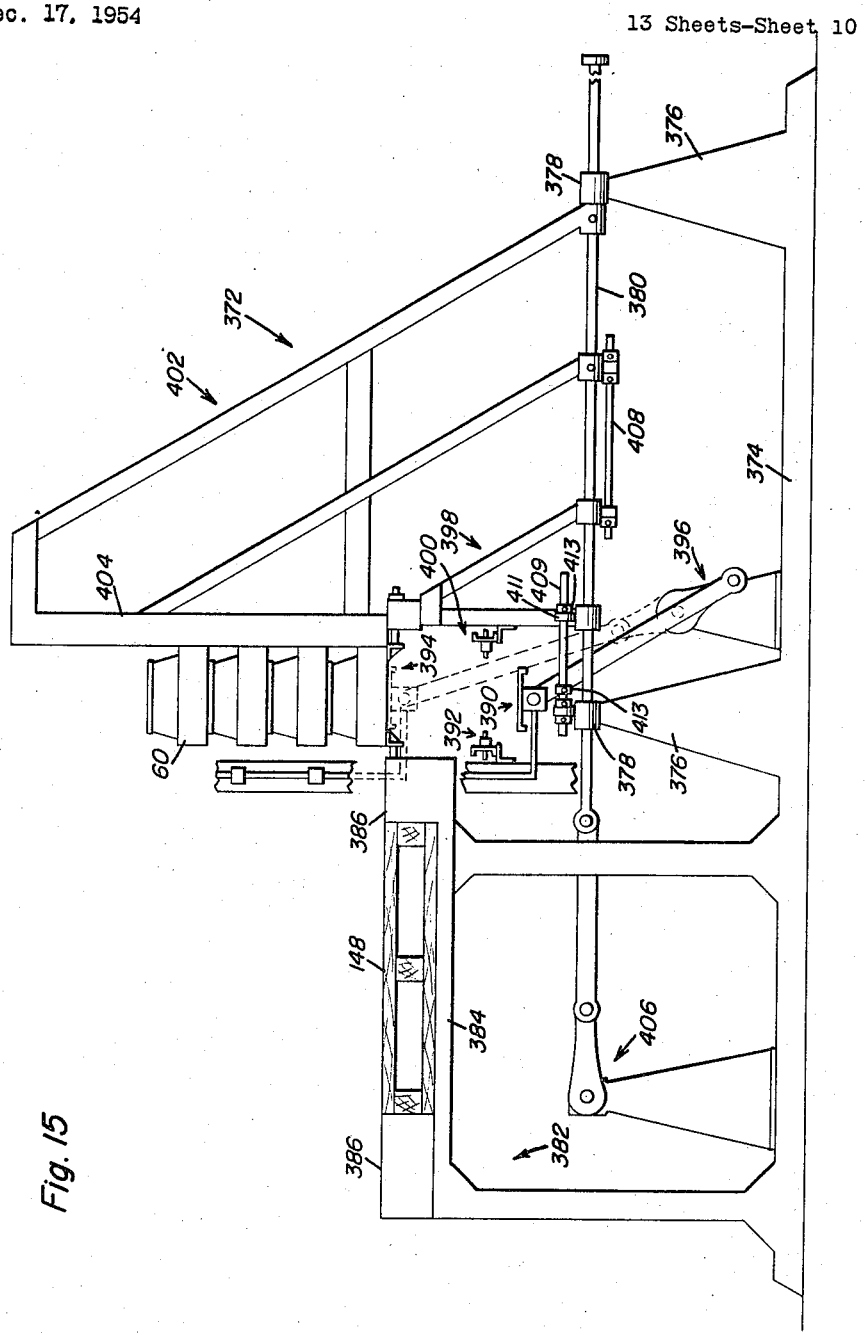

Figure 4 is a vertical sectional view on a larger scale taken through the pallet supporting platform portion of the pallet loading device of Figure 1 and shows the details of a transverse conveyor for selectively removing a loaded pallet from the pallet supporting platform, a loaded pallet being shown in dotted lines on an adjacent conveyor being moved towards either a storage or loading area;

Figure 5 is an enlarged fragmentary elevational view showing a pallet carried by a pallet supporting platform of the automatic pallet loader in a shifted position underlying a stack of articles or cases for receiving such stack, only those portions of the pallet loader essential to this operation being illustrated;

Figure 6 is an enlarged fragmentary elevational view showing the elevating and stacking means of the automatic pallet loader in an article elevating position, the delivery conveyor for the automatic pallet loader and all parts of the pallet loader not essential for this operation being omitted for purposes of clarity;

Figure 7 is an enlarged longitudinal vertical sectional view taken through the scrambler of Figure 1 and shows the operating details thereof, the scrambler being illustrated in a position just receiving a stack of articles to be scrambled, the heights of the stacks being reduced in order to clearly illustrate in dotted line the relationship of individual articles of a stack when the articles are being removed from the stack by the scrambler;

Figure 8 is an enlarged fragmentary sectional view similar to Figure 7 and shows the upper portion of the scrambler and the means for removing individual articles or cases from a stack and shifting them onto an exit conveyor, first positions of the article removing means and an article being shown by dotted lines, a second position of the article being shown by dot-dash lines, and a third position of the article on the conveyor being shown by double dot-dash lines;

Figure 9 is an enlarged fragmentary horizontal sectional view taken through the upper portion of the scrambler, as viewed in Figure 7, and shows the general details of the drive means for the scrambler and the relationship of the article removing means with respect to a short longitudinal conveyor;

Figure 10 is a wiring diagram for the automatic pallet loader;

Figure 11 is an enlarged fragmentary elevational view taken through a stacking portion of the automatic pallet loader and shows a slightly modified form of article retaining means, the article retaining means being illustrated in position for retaining articles in stacked relation thereon immediately prior to reception of a next article;

Figure 12 is an elevational view similar to Figure 11 and shows a first article supporting plate of the article retaining means being automatically withdrawn so as to permit dropping of one side of a stack of box-like articles;

Figure 13 is a view similar to Figure 11 and shows both of the article retaining plates being withdrawn in order to permit the stack of box-like articles to rest upon a next lower article carried by the elevating means of the automatic pallet loader;

Figure 14 is an elevational view similar to Figure 11 and shows the newly added box-like article and the remainder of the articles of the stack elevated above the retaining means and the plates of the retaining means moving back into position underlying the stack of articles for receiving the stack when the elevating means is lowered;

Figure 15 is a side elevational view of a slightly modified form of automatic pallet loader and shows the same in position for stacking articles, an elevating position of the article elevating device being shown in dotted lines;

Figure 16 is an elevational view similar to Figure 15 and shows a pallet carried by the automatic pallet loader being moved with respect to the stack of articles so that the stack of articles may be automatically received on the pallet;

Figure 17 is an elevational view of still another modified form of automatic pallet loader and shows a modified drive means for operating both the elevating means and the pallet shifting means, the automatic pallet loader being shown in an initial article receiving position;

Figure 18 is a fragmentary elevational view of the modified form of pallet loader of Figure 17 and shows the elevating means thereof in an article elevating position; and Figure 19 is a fragmentary side elevational view of the pallet loader of Figure 17 and shows a pallet carried by a platform thereof shifted into a position underlying a stack of articles to facilitate the stacking of such articles onto the pallet, the pallet being shown by dotted lines.

Referring now to the drawings in detail, it will be seen that there is illustrated in Figures 1 through 10, inclusive, the details of a complete automatic pallet loader and unloader which is referred to in general by the reference numeral 10. The pallet loader and unloader includes an automatic pallet loader which is referred to in general by the reference numeral 12, and a pallet unloader or scrambler which is referred to in general by the reference numeral 14.

Figure 3:
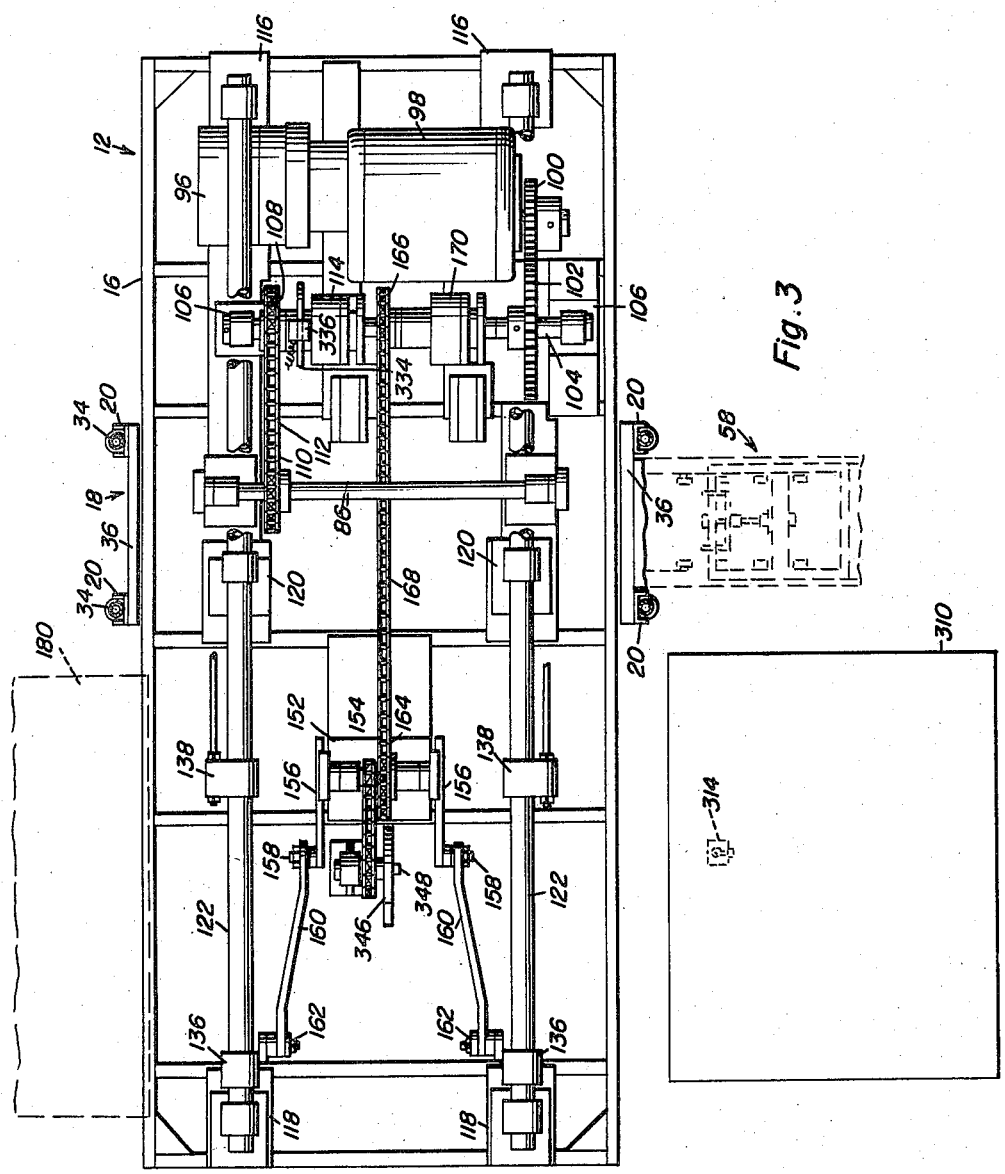
Figure 3 is an enlarged horizontal sectional view taken through the lower portion of the pallet loader of Figure 1 and shows more clearly the details of the operating mechanism thereof.

The pallet loader 12 includes an elongated base 16 which has extending upwardly from a central portion thereof an article stacking mechanism which is referred to in general by the reference numeral 18. As is best illustrated in Figures 3, 5 and 6, the article stacking mechanism 18 includes spaced pairs of vertical supports 20 disposed at opposite sides of the base 16 and projecting upwardly therefrom. The supports 20 are connected together at their upper ends by a longitudinal frame member 22. Secured to the frame members 22 and disposed therebetween in a transversely disposed position is a stack guide 24, the details of which will be described hereinafter. Carried by opposite sides 26 of the stack guide 24 are longitudinal support members 28. The support members 28 carry at adjacent opposite ends thereof vertically disposed guides 30. The guides 30 are aligned with lower guides 32 carried by intermediate portions of the supports 20.

Slidingly mounted in the guides 30 and 32 at opposite sides of the base 16 are guide rods 34. The lower ends of the guide rods 34 at each side of the base 16 are connected together by a longitudinal frame member 36. Rigidly secured to the central portion of each of the frame members 36 and extending upwardly therefrom is a plunger 38. The plungers 38 disposed at opposite sides of the base 16 are disposed in transverse alignment and connected together by transverse members 40 which form an article engaging head.

The article stacking mechanism 18 also includes article supporting means in the form of conveyor halves 42 and 44, one of the conveyor halves being disposed on each side of the plungers 38. The conveyor half 42 is carried by a frame assembly, which is referred to in general by the reference numeral 46, and which specific details will be described in more detail hereinafter. The conveyor half 42 includes a transverse frame member 48 which is rigidly secured to the frame assembly 46. Extending longitudinally from the frame member 48 and spaced transversely of the automatic pallet loader 12 is a series of rollers 50.

The conveyor half 44 is secured to a frame assembly which is referred to in general by the reference numeral 52 and which will be described in more detail hereinafter. The conveyor half 44 includes a transversely disposed frame member 54 rigidly secured to the frame assembly 52. Spaced transversely of the automatic pallet loader 12 and secured to the frame member 54 is a plurality of rollers 56. The rollers 56 are in opposed relation with respect to the rollers 50 and are in corresponding relation.

Figure 2:
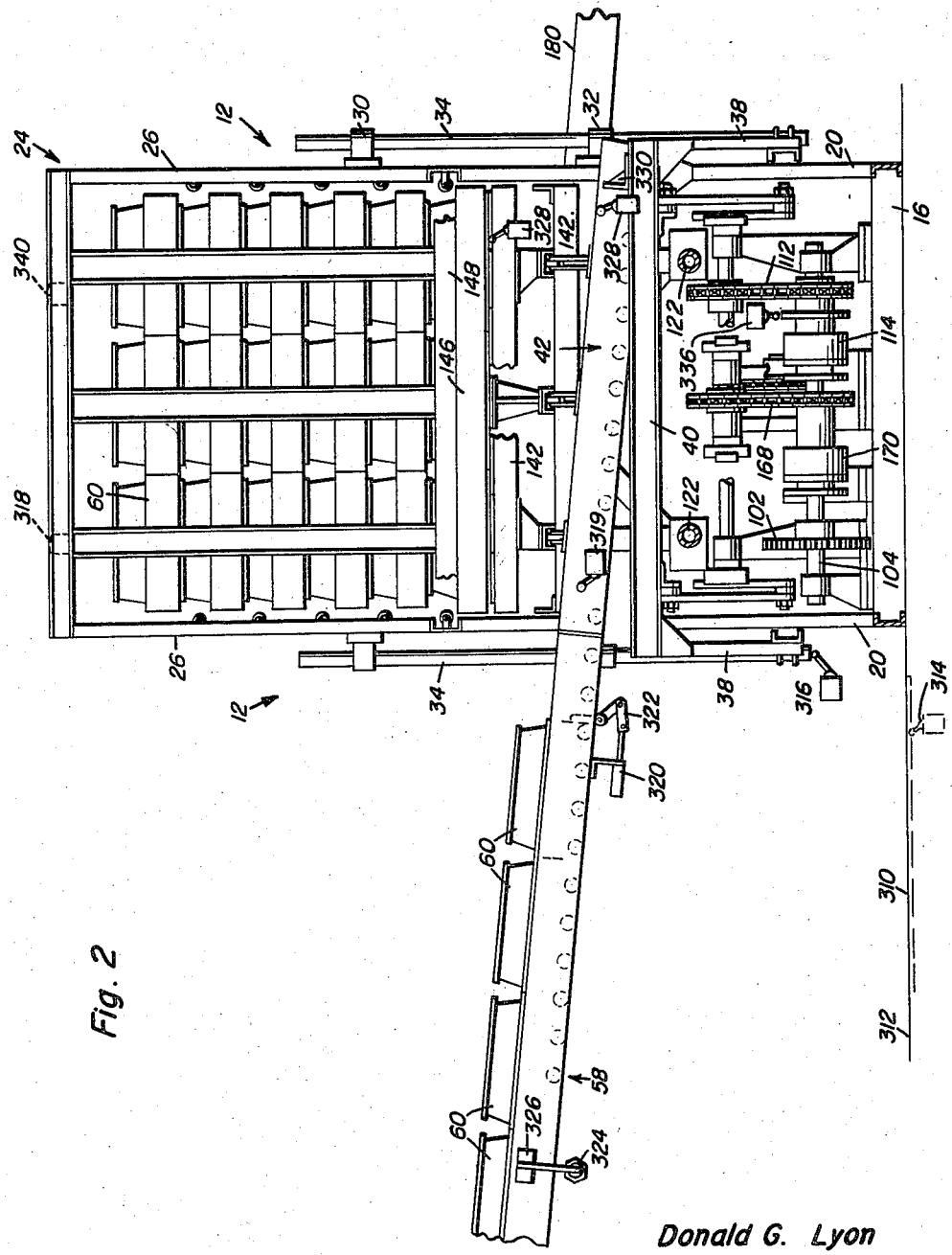
Figure 2 is an enlarged vertical sectional view taken transversely through the pallet loader of Figure 1 and shows the relationship of the delivery conveyor with respect to the pallet loader, also being illustrated are the drive means for the various portions of the automatic pallet loader.

Referring now to Figure 2 in particular, it will be seen that the conveyor half 42, as well as the conveyor half 44, slopes downwardly and to the right and is aligned with a conveyor which is referred to in general by the reference numeral 58. The conveyor 58, in the case of a bottling plant, will be part of the normal bottling mechanism and will deliver filled cases of bottles to the automatic pallet loader 12. It is to be understood that in the form of the pallet loader 12 illustrated, the conveyor halves 42 and 44 will be of sufficient length to receive in line transversely of the pallet loader 12, three cases of soft drink, such as the cases 60.

Referring once again to Figure 1, it will be seen that the plungers 38 and the frame members 40 are normally disposed below the rollers 50 and 56 and that the frame members 40 are of such a size and so spaced whereby they may move upwardly between the rollers 50 and 56. Thus, the frame members 40 which form the article engaging head, may move upwardly between the conveyor halves 42 and 44 and lift articles, such as the cases 60, positioned thereon for the purpose of stacking them. In order that an article elevated by the frame members 40 may be retained in an elevated position, there is provided article retaining means which are referred to in general by the reference numeral 62. The article retaining means 62 includes a pair of spaced plates 64 and 66 which form parts of transversely disposed angle members 68 and 70, respectively. If desired, the angle members 68 and 70 may be reinforced by spaced gussets 72 which also function to push the plates 64 out of the way of an article in the event that automatic mechanism for operating them, to be described in more detail hereinafter, fails. The plate 64 is carried by a plunger 76 of a fluid motor 78. The fluid motor 78 is suitably secured to the frame assembly 46. The plate 66 is carried by a plunger 80 of a fluid motor 82 which is suitably mounted on the frame assembly 52.

It is to be noted that the plates 64 and 66 are normally disposed in the way of a case 60 being elevated. In order that the case 60 may be positioned above the plates 64 and 66, and rested thereupon, the plates 64 and 66 are automatically retracted in timed relation with the elevation of the case 60 (in a manner to be described in more detail hereinafter).

Referring now to Figures 2, 3 and 6 in particular, it will be seen that there is extending upwardly from the base 16 in transversely spaced relation a pair of supports 84. The supports 84 have suitably mounted thereon for rotation a transversely disposed crank 86. The crank 86 has connected to opposite ends thereof a crank arm 88. The crank arm 88 at each end of the crank 86 has connected thereto by a connecting pin 90 an elongated connecting rod 92. The upper end of the connecting rod 92 is connected to the upper portion of an associated one of the plungers 38 by a suitable pin 94. It will thus be seen that when the crank 86 is rotated, the crank arm 88 and the other connecting rod 92 will function to reciprocate vertically the plungers 38 so as to elevate an article, such as the case 60, from a position resting upon the article supporting means in the form of rollers 50 and 56 into overlying engagement with the article retaining means 62.

In order that the crank 86 may be suitably rotated, there is provided on the base 16 adjacent the right hand end thereof, as viewed in Figure 3, an electric motor 96 which is connected to a gear box 98. The gear box 98 is provided with a drive gear 100 which engages a driven gear 102 carried by a transverse shaft 104. The opposite ends of the transverse shaft 104 are suitably mounted in bearing blocks 106 projecting upwardly from the base 16. Rotatably carried by one end of the shaft 104 is a drive gear 108 which is in alignment with a driven gear 110 mounted on the crank 86. Entrained over the gears 108 and 110 and drivingly connecting the same together is a drive chain 112.

In order that the drive gear 108 may be selectively connected to the shaft 104 for rotation therewith, there is provided a clutch assembly 114. The clutch assembly is of a conventional electrically operated type which may employ a solenoid or the like for the operation thereof. Inasmuch as the clutch assembly 114 is conventional, the specific details of the structure and operation thereof need not be described in further detail hereinafter.

Referring once again to Figure 3 in particular, it will be seen that there is mounted on the base 16 and extending upwardly therefrom adjacent the right hand end thereof a transversely aligned pair of blocks 116. The blocks 116 are aligned with blocks 118 disposed at the opposite end of the base 16. An intermediate set of blocks 120 is also provided. Extending between the blocks 116 and 118, and 120 and mounted therein are elongated circular cross-sectional rails 122.

Mounted on the rails 122 adjacent the right hand ends thereof, as viewed in Figures 1 and 5, is the frame assembly 46. The frame assembly 46 includes a pair of transversely spaced, generally triangular end frame members 124 which terminate in a pair of longitudinally spaced sleeves 126 and 128, the sleeves 126 and 128 being guidingly disposed on the rails 122. The end frames 124 are connected together by transverse frame members 130 and 132. The frame member 130 underlies the conveyor half 42 and supports the same. The frame member 132 underlies the fluid motor 78 and supports the same.

Mounted on the opposite ends of the rails 122 is the frame assembly 52. The frame assembly 52 includes a generally horizontal base 134 which has secured to the underside thereof transversely aligned pairs of sleeves 136 and 138. Extending upwardly from the base 134 is a platform assembly 140 on which a pallet is intended to be rested.

The platform assembly 140 includes an upper table portion 142 which is horizontally disposed and which extends to the right of the base 134. The table 142 has secured to the underside thereof along the right hand edge the conveyor half 44. The conveyor half 44, being connected to the table 142, is movable therewith.

Extending transversely of the table 142 adjacent the right hand end thereof is a transverse frame member 144 on which is mounted the fluid motor 82.

Extending upwardly from the table 142 adjacent the frame member 144 is a guide 146 for a pallet, such as the pallet 148. Extending to the right from the upper end of the guide 146 is a horizontally disposed plate 150. The plate 150 extends transversely of the automatic pallet loader 12 and is in horizontal alignment with the plates 64 and 66.

Extending upwardly from the central portion of the base 16 is a bearing block assembly 152. The bearing block 152 has rotatably journaled therein a relatively short crankshaft 154 which is provided at opposite ends thereof with crank arms 156. The crank arms 156 have pivotally connected thereto by pins 158 connecting arms 160. The connecting arms 160 are pivotally connected by pins 162 to the sleeve 136.

In order that the crankshaft 154 may be suitably rotated, there is mounted thereon a driven gear 164. The driven gear 164 is aligned with a drive gear 166 rotatably carried by the shaft 104. Entrained over the gears 164 and 166 and connecting them together is a driven chain 168. In order that the crankshaft 154 may be selectively rotated, there is provided an electric clutch assembly 170 for controlling the driving interlocking of the drive gear 166 with the drive shaft 104.

From the foregoing, it will be readily apparent that when the crankshaft 154 is rotated, the frame assembly 52 will be moved to the right, as viewed in Figure 1. Inasmuch as the half conveyors 42 and 44, as well as the plates 64 and 66, are aligned, it will be readily apparent that continued movement of the frame assembly 52 to the right, as viewed in Figure 1, will result in the engagement of the two pairs of units. Accordingly, in order that the frame assembly 46 may be moved after an initial movement of the frame assembly 52, there are provided connecting rods 172. The connecting rods are rigidly carried by extension portions of the sleeves 138 and are slidably received in extensions of the sleeves 126 and 128. Provided at the extreme ends of the connecting rods 172 are first nuts 174. Disposed adjacent the ends of the connecting rods 172 on which the nuts 174 are mounted are nuts 176.

After the frame assembly 52 has initially moved to the right, the nuts 176 engage the sleeve 126 and they result in movement of the frame assembly 46 to the right, as is best illustrated in Figure 5. Inasmuch as the article guide 24 will prevent the movement of a stack of articles, it will be seen that as the frame assembly 52 initially moves to the right, the plate 66 will move out from under a stack of articles resting thereupon and that the articles will then rest upon the plate 150. Further movement of the frame assembly 52 together with movement of the frame assembly 46 to the right, as viewed in Figure 5, will result in the movement of the plates 64, 66 and 150 entirely out from under the stack of articles with the result that the pallet 148 will move thereunder and the stack will then rest upon the pallet 148, as desired.

After the stack of articles is set upon the pallet 148, the pallet 148 together with the frame assembly 52 is moved to the left to its original position. During this movement, the nuts 174 engage the sleeve 128 to return the frame assembly 46 to its original position.

Referring now to Figure 4 in particular, it will be seen that there is disposed at one side of the platform assembly 140 a conveyor 180. The conveyor 180 is a conventional roller type conveyor and is intended to receive a pallet 148 loaded with cases 60 for transmitting the pallet 148 and the cases 60 to either a storage point or a truck loading point. In order that the pallet 148 resting upon the table assembly 114 may be automatically transferred to the conveyor 180, there is provided pallet shifting means which are referred to in general by the reference numeral 182.

As is best illustrated in Figures 4 and 5, underlying the table assembly 140 and resting upon the base 134, the pallet shifting means 182 includes a generally rectangular frame 184. The frame 184 is of a size to directly underlie a pallet 148. The frame 184 is supported in an elevated position with respect to the base 134 by rectangularly arranged extensible cylinders 186.

Carried by the frame 184 within the general confines thereof is a longitudinally disposed drive shaft 188 and a spaced idler shaft 190. Mounted on the drive shaft 188 is a drive gear 192 which is aligned with a drive gear 194 on the idler shaft 190. It is to be understood that a second pair of such gears 192 and 194 are disposed adjacent the opposite ends of the shafts 188 and 190, respectively. Entrained over the pairs of gears 192 and 194 are conveyor chains 196.

In order that the conveyor chains 196 may be driven, there is provided an electric motor 198 which is suspended from the frame 184 on a carriage 200. The electric motor 198 is connected to the drive shaft 188 by a drive chain 202.

Disposed adjacent the table 142, which is in the form of a rectangular frame, and extending outwardly therefrom toward the conveyor 180 is a slide plate 204. The slide plate 204 is provided at its outer end with a longitudinal roller 206.

When the pallet 148 is loaded with cases 60, in the sequence of the operation of the automatic pallet loader, the extensible cylinders 186 are automatically extended to elevate the frame 184 and the conveyor chains 196 simultaneously with the operation of the electric motor 198. This results in the conveyor chains 196 both elevating the pallet 148 off the table 142 and transferring it to the right, as viewed in Figure 4, onto the conveyor 180.

Referring now to Figures 7, 8 and 9 in particular, it will be seen that the scrambler 14 includes a separate base 208 which is supported by suitable standards 210. If desired, the standards 210 may be secured to the base 16, as is illustrated in Figure 1. Extending upwardly from the base 208 is a supporting frame which is referred to in general by the reference numeral 212.

The supporting frame 212 includes right hand standards 214 and left hand standards 216 which are in longitudinally spaced relation. Connecting together the standards 214 and 216 at opposite sides of the frame 212 is a lower longitudinal frame member 218, an intermediate longitudinal frame member 220, and an upper longitudinal frame member 222, the frame member 222 extending to the right of the right hand standard 214.

Carried by each of the upper longitudinal frame members 222 is a pillow block assembly 224. The pillow block assembly 224 has carried thereby a shaft 226 which extends transversely. The shaft 226 has connected thereto a sprocket 228. An idler sprocket 230 is carried by a shaft 232 secured to the associated left hand standard 216. Another idler sprocket 234 is carried by a shaft 236 mounted in a pillow block 238 carried by the lower longitudinal frame member 218 adjacent the standard 216.

A final idler sprocket 240 is mounted on an idler shaft 242 carried by a pillow block 244 mounted on the base 208. Entrained over the drive sprocket 228 and the idler sprockets 230, 234 and 240 is a conveyor chain 246. It is to be understood that there is a conveyor chain adjacent each side of the frame assembly 212.

Carried by the conveyor chains 246 at their half way points are plates 248. The plates 248 extend the full distance between the conveyor chains 246 and are braced relative thereto by turnbuckle assemblies 250.

In order that the conveyor chains 246 may be conveniently driven, there is provided an electric motor 252 which is supported on the lower longitudinal frame members 218. The electric motor 252, through a drive belt 254, drives an idler sprocket 256 carried by a pillow block 258 mounted on the right hand standard 214 at one side of the frame 212. The idler pulley 256 is mounted on a shaft 260 which also has mounted thereon a second idler pulley 262. The idler pulley 262 is aligned with a pulley 264 mounted on the shaft 226 and drivingly connected to the drive sprocket 228. A drive belt 266 connects the pulleys 264 and 262.

In order that articles, such as the cases 60, may be removed sequentially from their associated stacks, there is carried by the right hand end of each upper longitudinal frame member 222 a bearing block 268. Extending between the bearing blocks 268 is a shaft 270 which has mounted adjacent the opposite ends thereof lifting arms 272 which terminate in hooked ends 274. Also carried by the shaft 270 is a pulley 276 which is aligned with a pulley 278 mounted on a shaft 280. The shaft 280 is carried by the pillow block assembly 224, as is best illustrated in Figure 7, the pillow block assembly 224 being omitted in Figure 8 for purposes of clarity. Entrained over the pulleys 276 and 278 is a drive belt 282.

The pulley 278 is driven by a gear 284 connected thereto. The gear 284 is in mesh with the gear 286 rigidly secured to the shaft 226 and driven through the pulley 264.

Carried by each of the standards 214 is an inwardly projecting shaft 288 on which is mounted a lifting dog 290. Each of the lifting dogs 290 has connected thereto a pulley 292 which is driven by a drive belt 294. The drive belt 294 for each of the pulleys 292 is entrained over a suitable pulley (not shown) carried by the shaft 260.

It is to be noted that the scrambler 14 includes a housing 296. The housing 296 is intended to enclose most of the scrambler 14 and to protect workmen from the moving parts thereof.

As is best illustrated in Figure 7, the plates 248 are intended to elevate stacks of articles, such as the cases 60. In order that the cases 60 may be guided in their vertical movement, there is provided outside of each of the conveyor chains 246 a guide member 298. Each guide member 298 is suitably secured to its associated standard 214 and is engaged by the cases 60 in their upward travel.

Disposed to the left of the lifting dogs 290 and in line with the general longitudinal plane of the conveyor chains 246 is a downwardly sloping conveyor 300. The conveyor 300 is carried by suitable brackets 302 extending upwardly from the intermediate longitudinal frame member 220. The lower end of the conveyor 300 terminates in slightly overlying relation with respect to a transverse conveyor 304 which leads off in the direction one faces when viewing the scrambler in Figure 7.

In the operation of the scrambler 14, stacks of articles, such as the cases 60, are received from a pallet 148 and temporarily supported on transverse plates 306 extending upwardly from the table 142 at the left hand end thereof, as is best illustrated in Figure 5. After a stack of articles, such as the cases 60, are so positioned, they are engaged by one of the plates 248 which then tips the stack so that the cases 60 engage the guide 298. Then, the stack is moved upwardly and the individual cases 60 are sequentially engaged by the lifting arm 272 and the lifting dog 290.

As is best illustrated in Figure 8, the lifting dog 290 engages under the left hand end of the case 60 simultaneously with the hooked portion 274 engaging under the right hand end of the case. As the lifting arm 272 and the lifting dog 290 rotate, the left hand portion of the case 60 rides over the lifting dog 290 and is urged to the left by the lifting arm 272. The case 60 removed from the stack by the lifting arm 272 and the lifting dog 290 then slides down the conveyor 300 onto the conveyor 304 where it may then slide to a starting end of a conveyor system of a bottling plant (not shown).

In order that the operation of the pallet loader 12 and the scrambler 14 may be automatic, there is provided a series of controls which are best illustrated in the various views of the drawings and in the wiring diagram of Figure 10. In the operation of the present invention, it is intended that a pallet 148 containing cases of empty soft drink bottles be placed upon the table 142. Carried by the table 142 is a control switch 308 which is engaged by a pallet to close it. When the pallet 148 is being positioned on the table 142, the truck lift (not shown) supporting the pallet rests upon a plate 310 mounted in the floor 312 of the building in which the present invention is located. While the fork lift truck is positioned on the plate 310, it holds in an open position a normally closed switch 314 which is disposed in series with the switch 308. The purpose of these two switches will be described in more detail hereinafter.

Suitably mounted in alignment with one of the guide rods 34 is a normally open switch 316. The switch 316 is so positioned so that it is moved to a closed position only when the plungers 38 are in their lowermost position.

Carried by the upper part of the guide 26 in alignment with a stack of cases 60 and adapted to be engaged by an uppermost case 60 is a normally closed switch 318. The switch 318 is disposed in series with the switch 316.

A third switch 319 is also disposed in series with the switches 316 and 318. The switch 319 is normally closed and is positioned for engagement by cases 60 passing onto the conveyor halves 42 and 44, but so positioned that it is out of alignment with the cases 60 when they are properly positioned on the conveyor halves 42 and 44.

When all of the switches 316, 318 and 319 are closed, they energize a solenoid control member 321. The solenoid control member 321 controls the operation of a control valve 320 which is connected to a stop linkage 322. The stop linkage 322 is positionable in the way of a case 60 disposed on the conveyor 58 to prevent the case 60 from rolling down onto the conveyor halves 42 and 44.

The solenoid control member 321 also controls the actuation of a valve assembly 324 which has connected thereto gripping plates 326. The valve assembly 324 operates simultaneously with the valve assembly 320 so that when the stop assembly 322 is moved to an in-the-way position, the plates 326 grip the case 60 disposed therebetween to retain it in position while the cases to the right, as viewed in Figure 2, move onto the conveyor halves 42 and 44. As the cases 60 move downwardly onto the conveyor halves 42 and 44, the switch 319 is engaged and opened with the result that after all of the released cases 60 move over the stop assembly 322, it again moves to its case retaining position and the plates 326 release the other cases so that they may move down into the positions of the released cases 60.

Disposed adjacent the right ends of the conveyor halves 42 and 44 and secured to one of the transverse frame members 40 is a switch 328. The switch 328 is engaged by cases 60 as they move onto the conveyor halves 42 and 44 and engages a transverse stop member 330 carried by the transverse frame members 40. The switch 328 is disposed in series with an electromagnetic device 332 which controls the operation of the clutch assembly 114 which then causes the elevating means of the automatic pallet loader 12 to operate, whereby the cases 60 resting upon the conveyor halves 42 and 44 will be elevated by the plungers 38 and the transverse frame members 40.

As the cases 60 move upwardly, the fluid cylinders 78 and 82 are operated to withdraw the plates 64 and 66, respectively, in timed sequence with the upward movement of the case 60. This is accomplished by a cam 334 which is mounted on the shaft 104 and engages a control switch 336 to momentarily close it. The switch 336 is connected in series with an electromagnetic device 338 for controlling the operation of the cylinders 78 and 82.

When the plungers 38 return to their starting positions, due to the momentum of the crank assembly inasmuch as the switch 328 is opened when the cases were left on the plates 64 and 66 in the downward movement of the plungers 38, the guide rod 34 aligned with the switch 316 will again close the switch 316 to repeat the above mentioned cycle. This cycle is continued until a predetermined number of cases has been stacked vertically one above the other within the confines of the guide 26. At this time, the cases 60 engage the switch 318 to open the circuit to the electromagnetic control member 321 and thereby discontinue action of the stacking mechanism. At the same time, a switch 340 carried by the upper portion of the guide 26 is engaged by one of the cases 60 and moved to a closed position. The switch 340 is disposed in series with the switches 308 and 314 and with an electromagnetic device 342 which controls the operation of the clutch assembly 170. This results in the shifting of the frame assemblies 46 and 52 to the right, and the positioning of the cases 60 stacked within the guide 26 onto the pallet 148. It is to be understood that the switch 340 is a delayed action switch so as to permit a pallet 148 to be moved back to its initial position. Also, if desired, the switch 336 may be of the same type in order to permit the plungers 38 to return to their lowermost positions.

After the pallet 148 has been returned to its original position with the stacks of cases 60 thereon, the switch 318 will again be opened so as to permit the repeating of the stacking cycle. This is continued for a predetermined number of cycles until such time as the pallet 148 is loaded with stacks of cases 60. It is to be understood at this time that the cases 60 being loaded onto the pallet 148 are provided with filled soft drink bottles or the like and that the cases 60 which have been referred to hereinbefore with respect to the scrambler 14 are identical with the exception that the bottles are empty. In the case where it is desired to use the scrambler in conjunction with the automatic pallet loader 12, the pallet 148 will be first loaded with cases of empty bottles and the cases of empty bottles moved into engagement with the scrambler 14. Further, it is to be understood that the scrambler 14 will be of a size and have parts corresponding to the number of stacks for which the automatic pallet loader 12 is intended.

After a pallet 148 has been loaded with cases of filled bottles, the conveyor 182 is energized through the use of a control switch 342. The control switch 342 is disposed in series with the motor 198 and an electromagnetic device 344 for controlling operation of the extensible cylinders 186. The switch 342 is controlled by a cam 346 suitably carried by a shaft 348 above the base 16. The shaft 348 is driven by a chain 349 in timed sequence to the rotation of the shaft 154 to which it is connected. When energized, the conveyor 182 will shift the loaded pallet 148 onto the conveyor 180.

The actuation of the motor 252 of the scrambler 14 is controlled by a switch 350. The switch 350 is engaged by one of the plates 248 as it moves into position between associated pairs of plates 306. The plate 248 then moves the switch 350 in open position to stop the motor 252. However, when a stack of empty cases 60 is moved onto the plates 306, the switch 350 is engaged and moved to a closed position so as to operate the scrambler 14.

It is to be understood that the electric motor 96 is manually controlled by a switch 352. Thus, unless another fork lift truck together with another pallet 148 is ready to run onto the plate 310 to prevent operation of the clutch 114, it will be necessary for the operator of the machine 10 to shut off the machine by opening the switch 352 after a next series of stacks of cases 60 has been positioned within the guide 26. Once the fork lift truck is in position on the plate 310, the switch 352 may again be closed to resume operation of the machine 10.

Although one of the primary uses of the present invention is in the soft drink bottling industry to supplement the automatic machinery thereof, it is to be understood that the invention is useful for other purposes and may handle articles other than soft drink cases where the bottles of a case moving upwardly will engage the bottom of a next upper case supported on the plates 64 and 66 prior to their withdrawal. For example, in the canning industry, there are many large canneries which can vegetables in unlabeled cans and such cans are stored in cases until such time as there is an order, at which time the cases are unloaded, the appropriate labels placed on the cans, and then, the cases sealed. Such cases of unlabeled cans are normally stored in warehouses on pallets. By inserting the machine 10 in the automatic conveyor mechanism for applying labels to cans, it will be clearly apparent that stacks of unlabeled cans may be pushed off a pallet by stacks of labeled cans in automatic operation similar to that proposed above.

In order that the machine 10 may handle square cases and the like, there is provided in Figures 11 through 14, inclusive, a slightly modified form of article retaining means. It is to be noted that the cylinders 78 and 82 have been replaced by identical cylinders 354 and 356, respectively. These cylinders 354 and 356 include plungers 358 and 360 to which there are attached elongated angle members 362 and 364 having upper flanges or plate portions 366 and 368, respectively. Resting upon the plate portions 366 and 368 is a lowermost case 370 of a stack of cases 370, the individual cases 370 being rectangular and resting directly one upon the other. As a next case is elevated by the plungers 38 and the transverse frame members 40, and the next case 370 approaches the plate portions 366 and 368, a control mechanism similar to that described heretofore with respect to the cylinders 78 and 82 causes withdrawal of the plunger 358 and the angle member 362 so that the plate portion 366 moves out from beneath the case 370 resting thereupon so that the case 370 has that end thereof tilted downwardly and resting upon the case 370 being elevated. Next, other suitable mechanism will cause withdrawal of the plunger 360 to move the angle member 364 out of alignment with the cases 370, as is illustrated in Figure 13. With both of the plate portions 366 and 368 withdrawn, the case 370 being elevated may then be moved up between the angle members 362 and 364 into full engagement with the previous lowermost case 370 of the stack, as is best illustrated in Figure 14. After the last case 370 being elevated has cleared the plate portions 366 and 368, the plungers 358 and 360 may again be extended so that the plate portions 366 and 368 underlie the cases 370 and the cases may again be rested thereupon.

From the foregoing description of the last mentioned article retaining means, it will be readily apparent that articles of all shapes that are stackable may be handled by the present invention. It is to be understood that under certain circumstances, it may be necessary to slightly change the shapes of the article retaining means to correspond to the particular shape of article being rested thereupon.

Referring now to Figures 15 and 16 in particular, it will be seen that there is illustrated a slightly modified form of automatic pallet loader which is referred to in general by the reference numeral 372. The automatic pallet loader 372 includes a base 374 which has projecting upwardly therefrom at spaced intervals transverse pairs of standards 376. The standards 376 are provided at their upper ends with guide sleeves 378 horizontally disposed and having mounted therein longitudinally movable shafts 380.

The shaft 380 and the standards 376 are disposed adjacent the right hand end of the base 374. Mounted on the base 374 at the left hand end thereof, as viewed in Figure 15, is a stationary platform assembly 382 which includes an upper table 384 on which a pallet 148 rests. The pallet 148 is disposed between stop blocks 386 and 388 disposed at opposite ends of the table 384 to position the pallet 148 and prevent longitudinal sliding movement thereof.

Rigidly carried by the platform assembly 382 are elevating means 390 similar to the elevating means of the pallet loader 12, a conveyor half 392 identical with the conveyor half 44, and a fixed half of article retaining means 394, which means are identical to the article retaining means of the automatic pallet loader 12. The elevating means 390 is driven by a crank arm assembly 396 which is identical to that previously described and driven by the same type of drive means. Accordingly, the operation of the elevating means 390 need not be described or illustrated in more detail.

Frictionally mounted on the shafts 380 and momentarily slidable therewith is a frame assembly 398 which is identical with the frame assembly 46. Carried by the frame assembly 398 is a conveyor half 400 which corresponds with the conveyor half 42. Also, there is carried by the frame assembly 398 the other half of the article retaining means 394 for movement therewith.

Rigidly mounted on the shafts 380 to the right of the frame assembly 398 is a frame assembly 402. The frame assembly 402 extends upwardly above the frame assembly 398 and includes a combination guide and pusher plate 404. The guide 404 is intended to have disposed in front thereof, or at the left thereof, as viewed in Figure 15, a stack of cases 60 or other similar articles. The operating procedure of the automatic pallet loader 372 is identical with that of the automatic pallet loader 12 until the desired number of cases 60 has been arranged in stacks in front of the guide 404. Then, a crank arm assembly 406, which is similar to the corresponding crank arm assembly of the automatic pallet loader 12 is actuated to move the shafts 380 to the left. The movement of the shafts 380 to the left results in simultaneous movements of the frame assemblies 398 and 404 to the left until such time as a lower part of the frame assembly 398 engages the sleeves 378 of the left hand standards 376, as is best illustrated in Figure 16. Further actuation of the crank assembly 406 results in movement of the shafts 380 to the left to move the frame assembly 402 to the left beyond the frame assembly 398, whereby the stacks of cases 60 are slid into overlying relation with respect to the pallet 148, as is illustrated in Figure 16.

As the shafts 380 move to the right, the frame assembly 402 moves therewith. However, the frame assembly 398 has a tendency to remain to the left and is pulled to the right by rods 408 which extend between the frame assemblies 398 and 402. It is to be noted that there is a lost motion connection between the frame assemblies 398 and 402 through the use of the rods 408 similar to that utilized between the frame assemblies 46 and 52. In order that movement of the frame assembly 398 may be limited in both directions of its travel, there is secured to the guide sleeves 378 longitudinally extending rods 409. The rods 409 pass through ears 411 on the frame assembly 398 and are provided with adjustable collars 413 for engagement with the ears 411 to limit the travel of the frame assembly 398.

It will be noted that the principle of operation of the automatic pallet loader 372 is identical to that of the automatic pallet loader 12 with the exception that in lieu of the pallet 148 being moved under the stack of cases 60 as in the case of the automatic pallet loader 12, the stack of cases 60 is moved into overlying relation with respect to the fixed pallet 148 by the automatic pallet loader 372. Other than this, all of the controls and drive means for the two pallet loaders are identical. Further, although the scrambler 14 has not been illustrated in conjunction with the pallet loader 372, it is to be understood that it may obviously be so related.

Referring now to Figures 17, 18 and 19 in particular, it will be seen that there is illustrated still another modified form of automatic pallet loader which is referred to in general by the reference numeral 410. The automatic pallet loader 410 is substantially identical with the automatic pallet loader 12 with the exception of the drive means, and accordingly, the same reference numerals will be applied to like parts. One of the major differences between the pallet loader 12 and the pallet loader 410 is that the pallet loader 410 includes an additional frame 412 which extends upwardly from the base 16 and which is connected to the right hand support 20. Mounted on the frame 412 is a hydraulic system which is referred to in general by the reference numeral 414. The hydraulic system 414 includes a hydraulic pump 416 and a reservoir 418. It is to be understood that the hydraulic system 414 is intended to replace the motor 96, the gear box 98, the shaft 104, the clutches 114 and 170 and the similar drive members.

In order that the elevating means may be operated, there is provided a fluid motor 420 having its lower end connected to the frame member 22. The fluid motor 420 includes a piston rod 422 whose upper end is connected to a transverse bar 424 connecting together upper ends of the guide rods 34. It is to be understood that there is provided a fluid motor 420 for each side of the automatic pallet loader 410.

In order that the plungers 38 may move up in unison so as to retain the transverse frame members 40 level, there is secured to one side of each of the plungers 38 a rack 426. The rack 426 is engaged by a pinion 428 which is mounted on a transversely extending shaft 430. Inasmuch as there is a pinion 428 for each rack 426, there is provided a pinion 428 mounted on each end of the shaft 430 for rotation therewith. It will be understood that the shaft 430 will be suitably mounted with respect to the frame of the automatic pallet loader 410.

Other than the utilization of the fluid motor 420, it is to be understood that the stacking operation of the automatic pallet loader 410 will be identical with that of the automatic pallet loader 12. In order that the fluid motors 420 may function properly, the electromagnetic device 332 normally utilized for actuating the clutch 114 may be utilized for controlling the valve control for the fluid motors 420.

It is to be noted that the crank assembly for shifting the frame assemblies 52 and 46 along the shafts 122 have now been replaced by an extensible fluid motor 432. The fluid motor 432 includes a piston rod 434 which is suitably connected to the sleeves 138 of the frame assembly 52. The opposite end of the fluid motor 432 has been illustrated as being secured to the standard 210 of the scrambler 14. However, it is to be understood that if desired, the fluid motor 432 could be secured directly to the base 16 or to some other upright.

Inasmuch as the fluid motor 432 replaces the crank assembly used in conjunction with the frame assemblies 46 and 52 for shifting these frame assemblies, the necessity for the clutch assembly 170 has been eliminated. However, the electromagnetic control device 342 may be utilized for actuating the valve mechanism (not shown) for the fluid motor 432.

It is to be understood that the fluid motors 420 and 432 are to be suitably connected to the hydraulic system 414 and operated by suitable valving (not shown) in the manner outlined above. The automatic pallet loader 410 may be utilized in conjunction with the scrambler 14 or independently thereof, as desired. It is also readily apparent that the fluid motors 420 and 342 may be utilized in conjunction with the shifting procedure utilized in the modification illustrated in Figures 15 and 16.

Although only two specific examples of the systems in which the present invention may be utilized have been set forth in this application, it is readily apparent that numerous other uses will be found for the invention as the knowledge thereof increases in the various industries.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. An automatic pallet loader comprising supporting means for supporting an article, article retaining means disposed above said supporting means, elevating means underlying said supporting means and engageable with an article to move such article to an elevated position above said supporting means and into engagement with said retaining means, pallet supporting means for supporting a pallet adjacent an article carried by said retaining means, shifting means for effecting a transfer of such article from said retaining means onto a pallet, said article retaining means being in the form of opposed plates, said plates being mounted on retractible plungers, said retaining means being disposed in the path of travel of an article when being elevated by said elevating means, and means connected to said retaining means to retract said plungers and said plates in response to an article elevating movement of said elevating means, and in timed sequence whereby one side of an article is first dropped and then the other whereby box-like articles may be handled.

2. Apparatus for simultaneously unloading and loading pallets carrying first articles into the apparatus and carrying second articles from the apparatus, the articles being arranged in adjacent rows and vertical stacks in which upper articles rest upon lower articles: said apparatus comprising a first device having a support on which a pallet loaded with stacks of first articles is disposed; a second device connected to said first device including means receiving second articles and accumulating the same in adjacent rows and vertical stacks adjacent said pallet support of the first device; a third device connected to said first device including means receiving stacked rows of first articles from the pallet; and means in said apparatus operative for shifting said pallet support and said accumulating means for the stacks of second articles in said second device relative to each other whereby the stacks of second articles are transferred onto the pallet supported by said first device and displace a similar number of stacks of first articles from the pallet to said third device.

3. Apparatus for simultaneously unloading and loading pallets carrying first articles into the apparatus and carrying second articles from the apparatus, the articles being arranged in adjacent rows and vertical stacks in which upper articles rest upon lower articles: said apparatus comprising a first device having a support on which a pallet loaded with stacks of first articles is disposed, said support including a conveyor operably moving the loaded pallet in and out of the apparatus, and pallet locating means on said support; a second device connected to said first device including means receiving the second articles and accumulating the same in adjacent rows and vertical stacks adjacent said pallet support of the first device; a third device connected to said first device including means receiving stacked rows of first articles from the pallet; and means in said apparatus operative for shifting said pallet support and said accumulating means for the stacks of second articles in said second device relative to each other whereby the stacks of second articles are transferred onto the pallet supported by said first device and displace a similar number of stacks of first articles from the pallet to said third device.

4. Apparatus for simultaneously unloading and loading pallets carrying first articles into the apparatus and carrying second articles from the apparatus, the articles being arranged in adjacent rows and vertical stacks in which upper articles rest upon lower articles; said apparatus comprising a first device having a support on which a pallet loaded with stacks of first articles is disposed; a second device connected to said first device including means receiving the second articles and accumulating the same in adjacent rows and vertical stacks adjacent said pallet support of the first device, said second device also including supporting means for receiving the second articles, second article retaining means spaced from said supporting means, and means to transfer the second articles successively from said supporting means to said retaining means until a stack of second articles is accumulated; a third device connected to said first device including means receiving stacked rows of first articles from the pallet; and means in said apparatus operative for shifting said pallet support and the stacks of second articles in said second device relative to each other whereby the stacks of second articles are transferred onto the pallet supported by said first device and displace a similar number of stacks of first articles from the pallet to said third device.

5. Apparatus for simultaneously unloading and loading pallets carrying first articles into the apparatus and carrying second articles from the apparatus, the articles being arranged in adjacent rows and vertical stacks in which upper articles rest upon lower articles: said apparatus comprising a first device having a support on which a pallet loaded with stacks of first articles is disposed; a second device connected to said first device and including means receiving the second articles and accumulating the same in adjacent rows and vertical stacks adjacent said pallet support of the first device, said second device also including supporting means for receiving a row of the second articles, second article retaining means spaced above said supporting means, and means to lift the rows of second articles successively from said supporting means to said retaining means until a stack of the second articles is accumulated; a third device connected to said first device to receive stacked rows of first articles from the pallet; and means in said apparatus operative for shifting said pallet support and the stacks of second articles in said second device relative to each other whereby the stacks of second articles are transferred onto the pallet supported by said first device and displace a similar number of stacks of first articles from the pallet to said third device.

6. Apparatus for simultaneously unloading and loading pallets carrying first articles into the apparatus and carrying second articles from the apparatus, the articles being arranged in adjacent rows and vertical stacks in which upper articles rest upon lower articles: said apparatus comprising a first device having a support on which a pallet loaded with stacks of first articles is disposed; a second device connected to said first device and having means receiving second articles and accumulating the same in adjacent rows and vertical stacks adjacent said pallet support of the first device, said second device also including supporting means for receiving the second articles, second article retaining means spaced from said supporting means, and means to transfer the second articles successively from said supporting means to said retaining means until a stack of second articles is accumulated; a third device connected to said first device to receive stacked rows of first articles from the pallet; and means in said apparatus operative for shifting said pallet support and the stacks of second articles in said second device relative to each other whereby the stacks of second articles are transferred onto the pallet supported by said first device and displace a similar number of stacks of first articles from the pallet to said third device, said pallet support and stack shifting means including a connection with said second article retaining means to shift the same with the stacks of second articles to support the second articles during shift thereof onto the pallet.

7. Apparatus for simultaneously unloading and loading pallets carrying first articles into the apparatus and carrying second articles from the apparatus, the articles being arranged in adjacent rows and vertical stacks in which upper articles rest upon lower articles: said apparatus comprising a first device having a support on which a pallet loaded with stacks of first articles is disposed; a second device connected to said first device and having means receiving second articles and accumulating the same in adjacent rows and vertical stacks adjacent said pallet support of the first device, said second device also including support means for receiving rows of the second articles, a pair of relatively movable second article retaining means spaced from said support means, and means successively transferring the second articles from said support means to said pair of retaining means until a stack of the second articles is accumulated; a third device connected to said first device to receive stacked rows of first articles from the pallet; and means in said apparatus operative for shifting said pallet support and the stacks of second articles in said second device relative to each other whereby the stacks of second articles are transferred onto the pallet supported by said first device and displace a similar number of stacks of first articles from the pallet to said third device, said pallet support and stack shifting means including a connection with said pair of relatively movable second article retaining means to move one thereof relative to the other for supporting the second articles during shift thereof onto the pallet.

8. Apparatus for unloading and loading in successive operations a pallet carrying articles arranged in adjacent rows and vertical stacks in which upper articles rest upon lower articles: said apparatus comprising a first device forming an elevated support for a pallet loaded with stacks of first articles to be unloaded and replaced with stacks of second articles; a second device connected to said first device for receiving second articles and stacking the same adjacent a pallet supported by said first device, said second device including a supporting means for second articles, article retaining means above said supporting means and adjacent a pallet on said elevated support of said first device to receive the second articles, and lifting means movable between said supporting means and retaining means to lift successive rows of second articles until a stack thereof is formed in said retaining means; and means in the apparatus successively shifting the stacks of second articles between said retaining means and the pallet loaded with stacks of first articles and simultaneously displacing a similar number of stacks of first articles from the pallet to unload the first articles and load the same pallet with second articles, said shifting means relatively shifting said pallet elevated support and said article retaining means.

9. Apparatus for unloading and loading in successive operations a pallet carrying articles arranged in adjacent rows and vertical stacks in which upper articles rest upon lower articles: said apparatus comprising a first device to support a pallet loaded with stacks of first articles to be unloaded and replaced with stacks of second articles; a second device connected to said first device and positioned to receive second articles and form stacks thereof adjacent the pallet, said second device including spaced supporting means to receive a row of second articles thereon, spaced retaining means above said supporting means to receive successive rows of the second articles, and lifting means movable between said spaced supporting means to lift successive rows of the second articles between said spaced retaining means, said retaining means automatically moving to pass each row of second articles and return to retain the same until a stack is formed; and means to successively shift the stacks of second articles onto the pallet loaded with stacks of first articles and displace a similar number of stacks of first articles from the pallet, said means having a connection with said spaced retaining means to move the latter into adjacency for supporting the stacks of second articles during shifting thereof onto the pallet.

10. Apparatus for unloading and loading in successive operations a pallet carrying articles arranged in adjacent rows and vertical stacks in which upper articles rest upon lower articles: said apparatus comprising a first device to support a pallet loaded with stacks of first articles to be unloaded and replaced with stacks of second articles; a second device connected to said first device and adapted to receive second articles and form stacks thereof adjacent the pallet, said second device including a first frame structure carrying an article supporting means and an article retaining means, a second frame structure carrying an article supporting means and an article retaining means, said article supporting means co-operating in receiving second articles thereon, means to lift the second articles from said supporting means to said retaining means and said retaining means cooperating in retaining the second articles to form a stack thereof, and a guide on one of said movable frames to guide the stacks of second articles; and motor operated means operatively connected to said first and second frame structures to move said frame structures relative to said first device for bringing the pallet and the stacks of second articles into loading position and to move one of said frame structures relative to said first device to shift the stacks of second articles onto the pallet, said cooperating retaining means forming a sliding surface for the second articles.

11. In apparatus for unloading a pallet carrying adjacently stacked articles with a load of similarly stacked articles, the improvement comprising: a first device to support the pallet loaded with stacks of first articles, including a conveyor to move the loaded pallet, and stop means to locate the pallet in a predetermined position; a second device adjacent said first device and including means to retain a plurality of aligned second articles adjacent the pallet and stack forming means successively operable to receive a plurality of aligned second articles and deliver the same to said retaining means to form a stack of the second articles, said retaining means being spaced from the pallet position; motor operated means operatively connected to said first and second devices and moving said devices relatively to close the space between said retaining means and the pallet and transfer the stacks of aligned second articles to the pallet and simultaneously displace a similar number of stacks of first articles from the pallet; and control means in said first and second devices to initiate operation of said stack forming means in response to a loaded pallet reaching said predetermined position and to energize said motor operated means in response to the formation of each stack of the aligned second articles.

12. In apparatus for loading a pallet with vertically arranged stacks of articles in which upper articles rest upon lower articles the combination which comprises a first device having a support to receive a pallet for loading; a second device including an article receiving conveyor composed of spaced side by side half sections normally retained in spaced relation, article retaining means above said receiving conveyor and including laterally spaced members corresponding with said half sections of said receiving elevator, and article elevating means movable upwardly from said conveyor half sections to raise articles to said retaining means for retention by said spaced members; and stack shifting means in said apparatus connected to said conveyor and said article retaining means for relatively moving said conveyor half sections and said article retaining members to adjacent positions closing the space therebetween and correspondingly shifting a stack of articles accumulated in said article retaining means onto the pallet.

13. The apparatus set forth in claim 12, wherein said half sections of said conveyor are provided with gravity roller means supporting articles therebetween, and said article elevating means is vertically movable between said half sections.

14. The apparatus set forth in claim 12, wherein one of said half sections and the corresponding article retaining member thereabove are fixed in adjacent relation to the pallet support in said first device.

15. The apparatus set forth in claim 12, wherein one of said half sections and the corresponding article retaining member thereabove are connected to the pallet support of said first device, and the other of said half sections and its corresponding article retaining member move relative thereto.

16. The apparatus set forth in claim 12, wherein said shifting means includes a frame, one of said half sections and the corresponding article retaining member being supported by said frame, and lost motion means connecting said frame to said shifting means to limit the amount of relative movement of said frame in said shifting means.

References Cited in the file of this patent

UNITED STATES PATENTS

| | | |
|---|---|---|
| 1,292,636 | Parker | Jan. 28, 1919 |
| 1,673,014 | Morrison | June 12, 1928 |
| 2,161,836 | Stevenson | June 13, 1939 |
| 2,258,461 | Marsden et al. | Oct. 7, 1941 |
| 2,313,478 | Neja | Mar. 9, 1943 |
| 2,633,251 | Bruce | Mar. 31, 1953 |
| 2,648,181 | Dalton | Aug. 18, 1953 |
| 2,661,100 | Ashford | Dec. 1, 1953 |

FOREIGN PATENTS

| | | |
|---|---|---|
| 653,990 | Great Britain | May 30, 1951 |